United States Patent [19]

Hasegawa

[11] Patent Number: 4,459,525

[45] Date of Patent: Jul. 10, 1984

[54] MOTOR SPEED CONTROL SYSTEM

[75] Inventor: Keiji Hasegawa, Yamato, Japan

[73] Assignee: Ricoh Company, Ltd., Tokyo, Japan

[21] Appl. No.: 463,171

[22] Filed: Feb. 2, 1983

[30] Foreign Application Priority Data

Feb. 3, 1982 [JP] Japan .................................. 57-14830
Feb. 3, 1982 [JP] Japan .................................. 57-14831

[51] Int. Cl.³ ............................................ G05B 13/00
[52] U.S. Cl. .................................... 318/561; 318/618;
364/148
[58] Field of Search ............... 318/615, 616, 617, 618,
318/561, 640, 313; 364/148

[56] References Cited

U.S. PATENT DOCUMENTS

| 4,031,443 | 6/1977 | Droux et al. | 318/617 X |
| 4,200,827 | 4/1980 | Oswald | 318/616 X |
| 4,288,731 | 9/1981 | Lee | 318/618 |
| 4,311,945 | 1/1982 | Aoyama | 318/561 |
| 4,340,848 | 7/1982 | Hanagata et al. | 318/561 |
| 4,404,505 | 9/1983 | Swanson et al. | 318/561 |
| 4,423,365 | 12/1983 | Turner | 318/561 |

Primary Examiner—B. Dobeck
Attorney, Agent, or Firm—David G. Alexander

[57] ABSTRACT

A speed control system for a selection servomotor of an impact printer or the like employs a speed table which represents a series of speed data which are respectively matched with various differences between real and mark positions of a motor shaft. The speed table is stored to be selectively read out when addressed. A difference between real and mark positions of the motor shaft is added to a head address of the speed table, and the sum is used as an initial address for reading data out of the speed table. Thereafter, the speed data are sequentially read out up to the head address in accordance with the rotation of the motor shaft, so that the motor is driven in response to such various data. A plurality of such speed tables are prepared to vary the speed profile in matching relation with a specific initial value of the difference between the real and mark positions of the motor shaft. One of the speed tables is selected in accordance with an initial value of the difference between the real and mark positions.

6 Claims, 6 Drawing Figures

MOTOR SPEED CONTROL SYSTEM

BACKGROUND OF THE INVENTION

The present invention relates to a motor speed control system applicable to a space servomotor and a selection servomotor operated in an impact printer, or the like.

In an impact printer, for example, it is desirable that a selection servomotor carrying a type wheel therewith be driven for rotation at a speed which matches with an angular distance or difference between a predetermined print position and a real or present position of a desired type element. This is to allow the desired type element to reach the print or mark position as fast and accurate as possible. It would be more desirable if the speed profile (relation between the difference and the speed) could be controlled to meet a specific initial value of the difference between the real and mark positions.

SUMMARY OF THE INVENTION

It is therefore an object of the present invention to provide a motor speed control system which is capable of controlling motor speed with accuracy yet simple in construction.

It is another object of the present invention to provide a motor speed control system which controls motor speed in matching relation with a specific distance (difference) between real and mark positions of a motor shaft.

It is another object of the present invention to provide a motor speed control system which controls motor speed while varying the speed profile on the basis of an initial value of the difference between real and mark positions of a motor shaft.

It is another object of the present invention to provide a generally improved motor speed control system.

In one aspect of the present invention, a motor speed control system is provided which comprises a real position data storage means for storing real position data indicative of a real position of a rotary shaft of the motor, a mark position data storage means for storing mark position data indicative of a mark position of the rotary shaft, a position difference calculator means for comparing real position data stored in the real position data storage means with mark position data stored in the mark position storage means and thereby calculating a difference between real and mark positions, a speed data storage means for storing a speed table which comprises a series of motor speed data corresponding to various difference between the real and mark positions, the data being selectively addressed to be read out of the speed data storage means, a head address designating means for designating the head address of the speed table stored in the speed data storage means, an adder means for adding an output of the position difference calculator means and an output of the head address designating means to each other, an address designating means for designating an initial address of the speed table stored in the storage means in response to an output of the adder means and, thereafter, sequentially varying the designated address up to the head address in accordance with the rotation of the shaft of the motor, and a motor drive means for driving the motor in response to speed data read out of the speed table stored in the speed data storage means.

In accordance with another aspect of the present invention, a motor speed control system is provided which comprises a real position data storage means for storing real position data indicative of a real position of a rotary shaft of the motor, a mark position data storage means for storing mark position data indicative of a mark position of the rotary shaft, a position difference calculating means for comparing real position data stored in the real position data storage means with mark position data stored in the mark position storage means and thereby calculating a difference between real and mark positions, a speed data storage means for storing a plurality of speed tables each comprising a series of motor speed corresponding to various differences between the real and mark positions, each of the tables corresponding to a specific initial value of the difference between the real and mark positions, a head address designating means for selecting one of the plurality of speed tables stored in the speed data storage means in response to an initial value of the difference between the real and mark positions, an adder means for adding an output of the position difference calculator means and an output of the head address designating means to each other, an address designating means for designating an initial address of the speed table stored in the storage means in response to an output of the adder means and, thereafter, sequentially varying the designated address up to the head address in accordance with the rotation of the shaft of the motor, and a motor drive means for driving the motor in response to speed data read out of the selected one of the plurality of speed tables stored in the speed data storage means.

Other objects and features, together with the foregoing, are attained in the embodiments described in the following description and illustrated in the accompanying drawings.

DESCRIPTION OF THE PREFERRED EMBODIMENTS

While the motor speed control system of the present invention is susceptible of numerous physical embodiments, depending upon the environment and requirements of use, substantial numbers of the herein shown and described embodiments have been made, tested and used, and all have performed in an eminently satisfactory manner.

Figure 1:
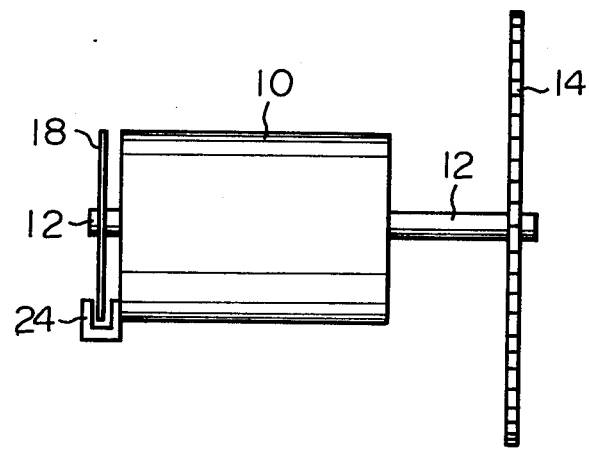
FIG. 1 is a schematic front view of a selection servomotor section of an impact printer to which a motor speed control system of the present invention is applicable.
Figure 2:
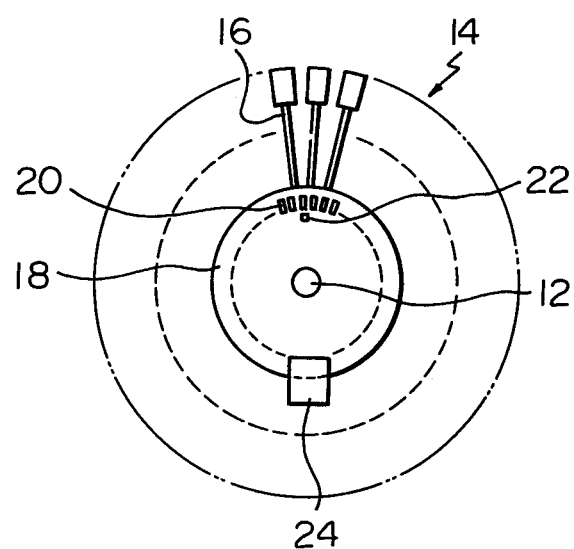
FIG. 2 is a side elevation of the selection servomotor section as viewed from the left.

Referring to FIGS. 1 and 2 of the drawings, there is shown a selection servomotor and its associated elements installed in an impact printer and controlled by the motor speed control system of the present invention. A selection servomotor 10 is mounted on a rotatable shaft 12 which carries a type wheel 14 at one end thereof. The type wheel 14 includes a number of type arms or fingers 16. The shaft 12 carries at the other end thereof a disc 18 which is formed with a number of slots 20 at circumferentially spaced locations on a common circle, and a slot 22 which is radially spaced from the slots 20 to define an origin. A Photosensor 24 is rigidly mounted on the rear end of the selection servomotor 10 in order to sense the slots 20 and 22.

Figure 3:
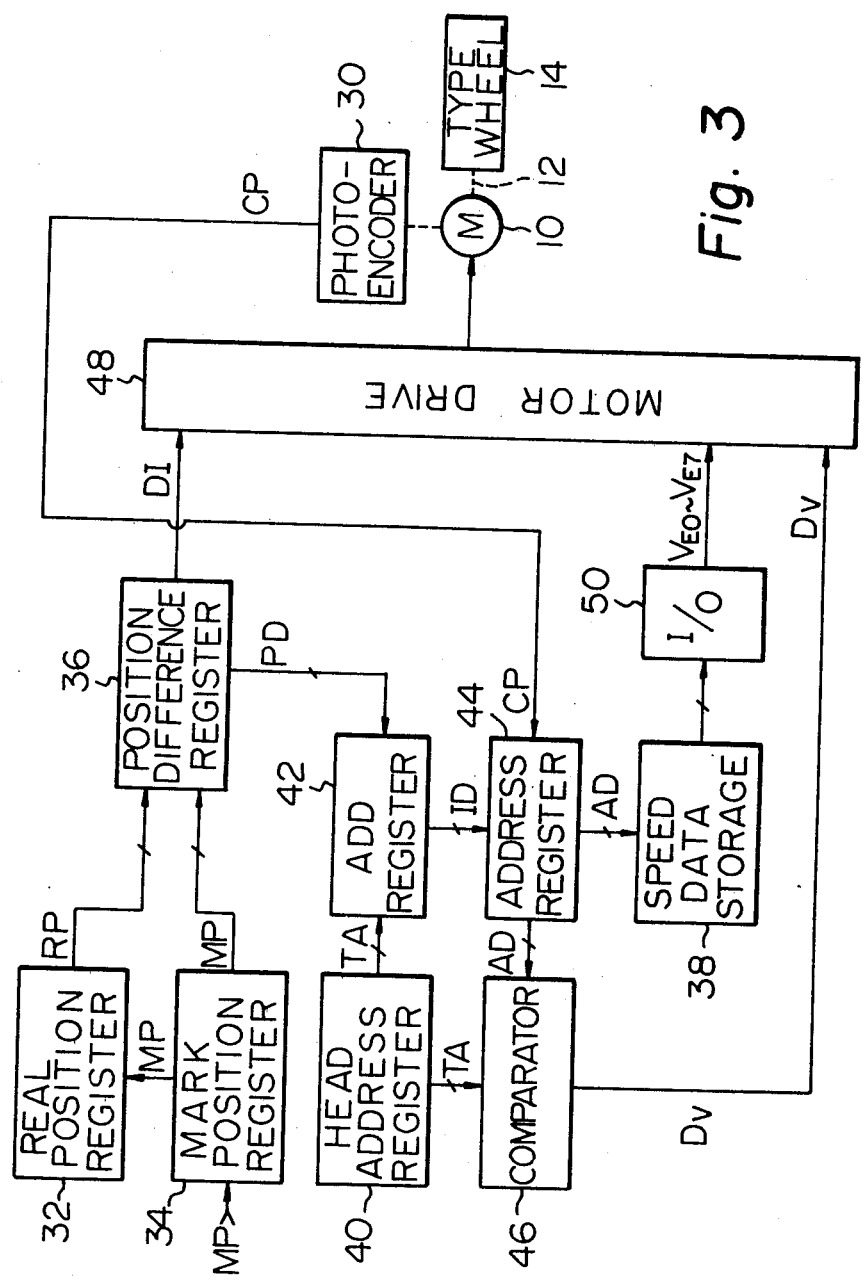
FIG. 3 is a block diagram of a motor speed control system embodying the present invention.

Referring to FIG. 3, the motor speed control system of the present invention is shown and includes a photoencoder 30. The photoencoder 30 comprises the slotted disc 20, photoencoder 24 and a waveshaping circuit, an amplifying circuit and the like (not shown), generating clock pulses CP timed to the rotation of the shaft 12 of the servomotor 10, i.e., the rotation of the type wheel 14. A real position register 32 functions as a real position data storage means which stores real position data RP indicative of a real of present position of the shaft 12. The data RP may comprises five bits by way of example. A mark position register 34 constitutes a mark position data storage means which stores mark position data MP indicative of a mark position of the shaft 12 supplied from a printer control section (not shown). The data MP, like the data RP, may comprise five bits by way of example. The mark position data MP will turn out itself to be the new real position data RP for the real position register 32 after the motor has been driven. A position difference register 36 serves as a distance calculating means which compares the real position data RP output from the register 32 with the mark position data MP output from the register 34, thereby delivering position difference data PD indicative of a difference between the actual and target positions and direction data DI indicative of an instructed direction of rotation of the servomotor 10.

A speed data storage 38 stores a speed table therein which is made up of a series of speed data which respectively correspond to various differences between real and mark positions. Such speed data are selectively addressed and read out as will be described. Where 5-bit data is employed for addressing purpose, the speed table may be constructed as shown in Table I.

TABLE I

| ADDRESS | SPEED | ADDRESS | SPEED |
|---------|-------|---------|-------|
| 00000 | V E 0 | 01000 | V E 4 |
| 00001 | V E 1 | 01100 | |
| 00010 | | 01101 | V E 5 |
| 00011 | V E 2 | 10000 | |
| 00100 | | 10001 | V E 6 |
| 00101 | V E 3 | 10111 | |
| 00111 | | 11000 | V E 7 |
| | | 11111 | |

In Table I, $V_{E0}$ indicates zero speed or a stop, $V_{E7}$ indicates the maximum speed and $V_{E1}$-$V_{E6}$ indicate successive intermediate speeds. These speeds $V_{En}$ are plotted in FIG. 4 with respect to position differences L.

A head address register 40, serving as a head address designating means, is adapted to output head address data TA which designates the head address of the speed table stored in the storage 38, i.e., "00000" in Table I. An addition register or adder means 42 adds the position difference data PD output from the register 36 and the head address data TA output from the register 40 to each other. The output ID of the addition register 42 is fed to an address register 44 which uses it as an initial value thereof. The address register 44 is progressively decremented (−1) from the initial value in synchronism with the clock pulses CP coupled thereto from the photoencoder 30, i.e., timed to the rotation of the shaft 12. The address data AD output from the address register 44 designates an address of the speed table stored in the storage 38.

A comparator 46 compares the head address data TA from the register 40 with the address data AD from the register 44, supplying a motor drive circuit 48 with a drive signal $D_V$ until the data TA and AD coincide with each other. The motor drive 48, as long as the drive signal $D_V$ from the comparator 46 is fed thereto, drives the servomotor 10 for rotation in a direction corresponding to the direction data DI from the position difference register 36 and at a speed corresponding to speed data $V_{E0}$-$V_{E7}$, which is coupled thereto from the speed data storage 38 via an input/output or I/O device 50.

The speed control system having the above construction will be operated as follows to control the operation speed of the servomotor 10.

The real position register 32 has stored real position data RP which represents a present position of the type wheel 14, i.e., the position of a type element held in the print position. The mark position register 34 is supplied by the printer control section with mark position data MP indicative of a mark position of the type wheel 14, i.e., the position of a type element which should move to the print position. Then, the position difference register 36 compares the real position data RP with the mark position data MP to deliver position difference data PD such as "11011". At the same time, the register 36 supplies the motor drive 48 with direction data DI which instructs a direction of rotation of the type wheel 14, either clockwise or counterclockwise. The addition register 42 adds the position difference data PD from the register 36 to the head address data TA from the register 40. For example, when the position difference data PD is "11011" and the head address data TA is "00000" as previously described, the register 42 will deliver a sum "11011".

In response to the sum data ID, the address register 44 designates an address of the speed table of the speed data storage 38 employing the data ID as address data AD. Assuming the sum data ID which is "11011", then this data serves as the address data which designates the address "11011" of the speed table. The speed data storage 38 supplies the motor drive 48 with the speed data $V_{E7}$ matching with the location indicated by Table 1, by way of I/O 50. As a result, the motor drive 48 rotates the servomotor 10 at a speed instructed by the speed data $V_{E7}$ and in a direction instructed by the direction data DI, due to the supply of the drive signal $D_V$ from the comparator 46.

While the servomotor 10 is rotated, the photoencoder 30 delivers clock pulses CP to the address register 44 which is then progressively decremented. For example, the address data AD of the address register 44 will be decremented from "11011" to "00000" through "11010", "11001" . . . In response to the successive address data AD, the speed data $V_{E7}$-$V_{E0}$ are read out sequentially from the speed table and fed to the motor drive 48. The motor drive 48 responds to each of the speed data $V_{E7}$-$V_{E0}$ by rotating the servomotor 10. As soon as the location data AD becomes "00000" indicative of a situation that the address data of the address register 44 has coincided with the head address data TA of the register 40 and the desired type element has reached the print position, the drive signal $D_V$ from the comparator 46 disappears to deactivate the motor drive 48 and thereby stop the servomotor 10.

In this manner, the servomotor 10 is driven at a speed which matches with a distance (difference) between actual and target positions of a desired type element, bringing the desired type element to the predetermined print position.

For convenience purpose, the present invention has been described above as employing a speed data storage 38 which stores speed data for the servomotor 10 only. Alternatively, in addition to the speed data for the servomotor 10, the storage 38 may store speed data for a space servomotor and the like. In this case, the speed data for the servomotor 10 is assumed to be stored in the addresses "00100000" to "00111111". Each of the registers 40, 42 and 44 comprises an 8-bit register; the register 40 is constructed to store data "00100000" while the register 42 is constructed to add position difference data PD from the register 36 to lower five bits out of the eight bits of data from the register 40. With this arrangement, only the speed data for the servomotor 10 can be read out of the plurality of different kinds of data stored in the storage 38.

If the system is designed to render the head address data in the register 40 variable from the outside, a single control circuit will suffice for, for example, the selection servomotor 10 and the space servomotor.

Furthermore, the speed data storage 38 may store a plurality of speed tables for the control of the servomotor 10 which respectively match with different initial values of the difference between real and mark positions. Then, a head address will be designated in correspondence with an initial value of the difference to select an optimum speed table.

Figure 4:
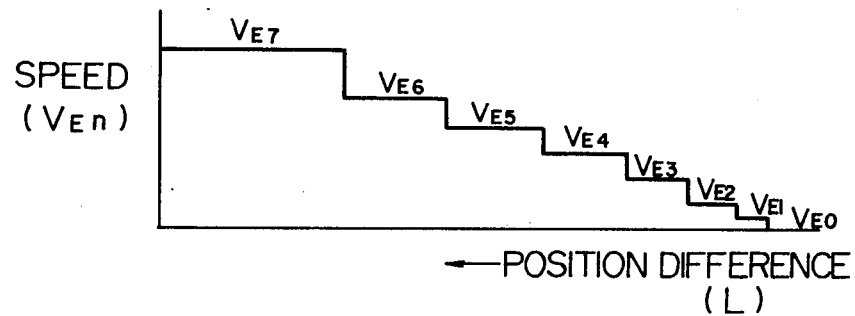
FIG. 4 is a plot representing a relationship between a position difference and a speed which will be used to describe a speed data storage shown in FIG. 3.
Figure 6:
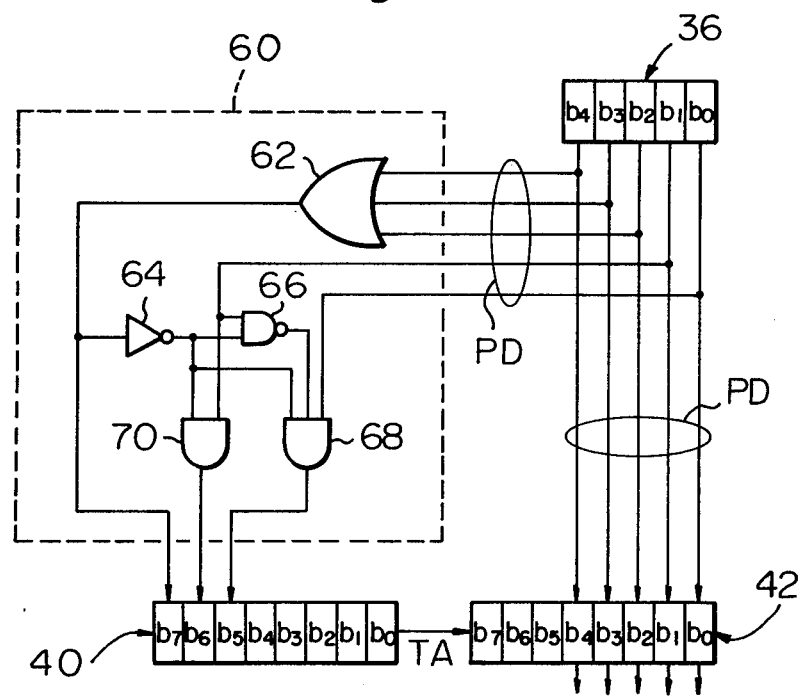
FIG. 6 is a circuit diagram showing a practical example of a data changeover circuit shown in FIG. 5.
Figure 5:
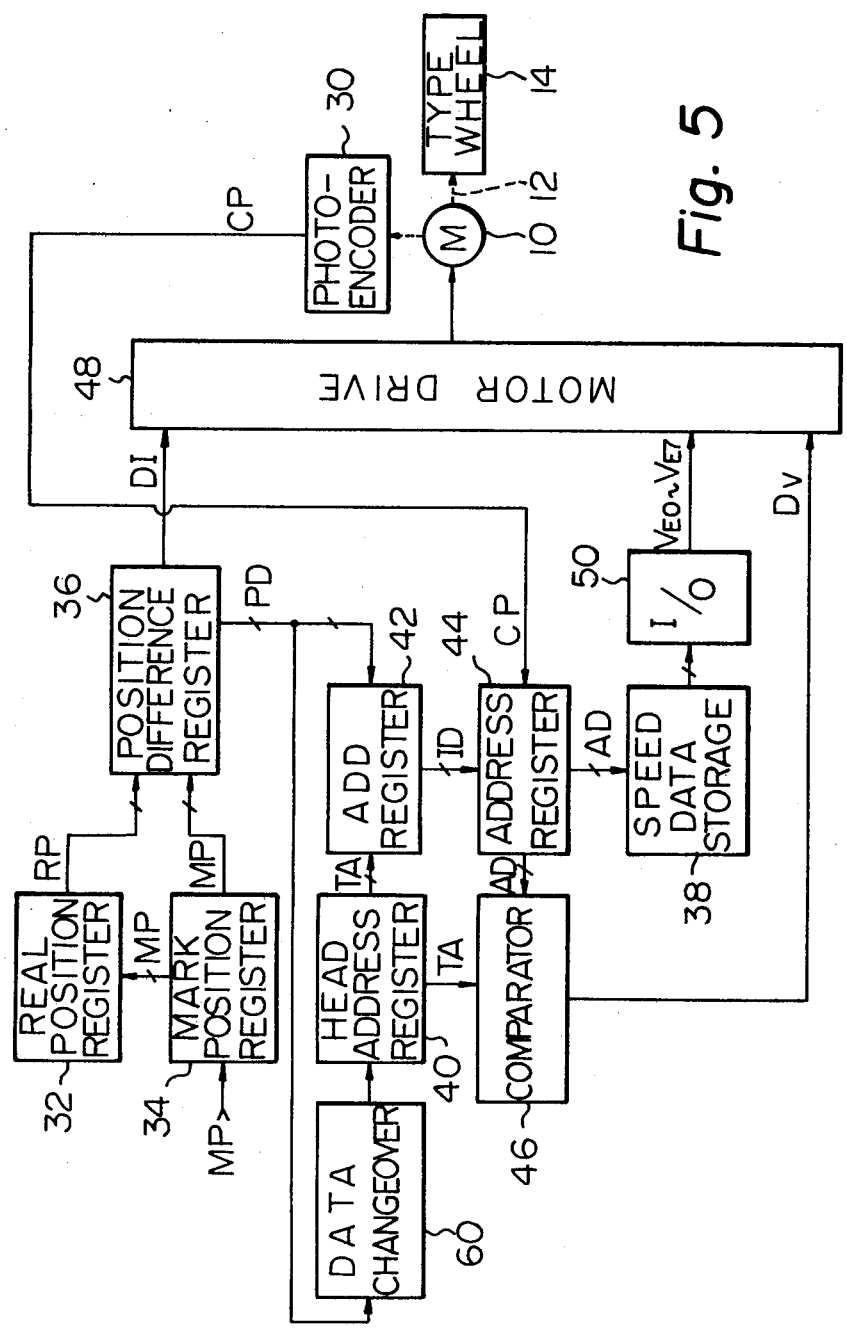
FIG. 5 is a block diagram of another embodiment of the present invention.

Reference will be made to FIGS. 5 and 6 for describing in detail another embodiment of the present invention which stores a plurality of speed tables in the speed data storage 38. In FIGS. 5 and 6, the same structural elements as those shown in FIGS. 1–4 will be designated by the same reference numerals and will not be described any further.

The speed data storage 38 in this alternative embodiment stores a plurality of speed tables each comprising a series of speed data which correspond to a specific initial value of the difference between real and mark positions. One of the speed tables may be constructed as shown in Table II in which an address is designated by 8-bit data, upper three bits of which designate a speed table and the lower five bits, a speed.

In Table II, $V_{E0}$ indicates zero speed or a stop, $V_{E7}$ indicates the maximum speed and $V_{E1}$–$V_{E6}$ indicate successive intermediate speeds. Again, these velocities $V_{En}$ may be plotted as shown in FIG. 4 with respect to the position difference L.

The head address register 40 outputs head address data TA, e.g., "10000000", which designates selected one of the head addresses of the plurality of speed tables stored in the speed data storage 38.

TABLE II

| ADDRESS TABLE | SPEED | SPEED | ADDRESS TABLE | SPEED | SPEED |
|---|---|---|---|---|---|
| 100 | 00000 | VE0 | 100 | 01001 | |
| 100 | 00001 | | 100 | 01100 | VE4 |
| | : | VE1 | 100 | 01100 | |

TABLE II-continued

| ADDRESS TABLE | SPEED | SPEED | ADDRESS TABLE | SPEED | SPEED |
|---|---|---|---|---|---|
| 100 | 00010 | | 100 | 01101 | |
| 100 | 00011 | | | : | VE5 |
| | : | VE2 | 100 | 10000 | |
| 100 | 00100 | | 100 | 10001 | |
| 100 | 00101 | | | : | VE6 |
| | : | VE3 | 100 | 10111 | |
| 100 | 00111 | | 100 | 11000 | |
| | | | | : | VE7 |
| | | | 100 | 11111 | |

A data changeover circuit 60 comprises, as shown in FIG. 6, an OR gate 62, a NOT gate 64, a NAND gate 66 and AND gates 68 and 70 which are so connected as to change over or vary the data in the upper three bits in the head address register 40, i.e., data for selecting a specific speed table, in response to an output of the position difference register 36. Table III shown below represents the relationship between the position data PD output from the register 36 and the head address data TA output from the register 40 and the control of the data changeover 60.

TABLE III

| POS. DIF. DATA | HEAD ADDRESS DATA |
|---|---|
| 00000 | 00000000 |
| 00001 | 00100000 |
| 00010 } 00011 | 01000000 |
| 00100 } 10000 | 10000000 |

In operation, the real position register 32 has stored real position data RP indicative of a real position of the type wheel 14, i.e., the position of a type element held in the print position. The mark position register 34 is supplied by the printer control section with mark position data MP indicative of a mark position of the type wheel 14, i.e., the position of a type element which should move to the print position. Then, the position difference register 36 compares the real position data RP with the mark position data MP to deliver position difference data PD such as "11011". Simultaneously, the register 36 supplies the motor drive 48 with direction data DI which instructs a direction of rotation of the type wheel 14. The addition register 42 adds the output data PD of the position difference register 36 to the head address data TA fed thereto from the register 40. If the position difference data PD is "11011" as previously mentioned, then the head address data will be "10000000" and the output of the adder 42, "10011011".

The address data 44 employs the output ID of the register 42 as data AD for designating an address of a speed table stored in the storage 38. Supposing output data "10011011", for example, it will select the speed table shown in Table II out of all the stored tables and specify a speed at the location "10011011". Then, the motor drive 48 is supplied by the storage 38 via the I/O unit 50 the speed data corresponding to the address indicated by Table II, i.e., speed data $V_{E7}$ due to the selected location "10011011" in this case. As a result, the motor drive 48 rotates the servomotor 10 at a speed instructed by the speed data $V_{E7}$ and in a direction instructed by the direction data DI, due to the supply of the drive signal $D_V$ from the comparator 46.

While the servomotor 10 is rotated, the photoencoder 30 delivers clock pulses CP to the address register 44 which is then progressively decremented. For example, the address data AD of the address register 44 will be decremented as "10011011", "10011010", "10011001".. . until it reaches "10000000". In response to the successive address data AD, the speed data $V_{E0}$–$V_{E7}$ are read out sequentially from the speed table and fed to the motor drive 48. The motor drive 48 responds to each of the speed data $V_{E7}$–$V_{E0}$ by rotating the servomotor 10. As soon as the location data AD becomes "10000000" indicative of a situation that the address data of the register 44 has coincided with the head address data TA of the register 40 and the desired type element has reached the print position, the drive signal $D_V$ from the comparator 46 disappears to deactivate the motor drive 48 and thereby stop the servomotor 10.

As in the first embodiment, it will be seen that the procedure discussed above drives the servomotor 10 at a speed which matches with a specific distance (difference) between actual and target positions of a desired type element, until the desired type element becomes settled at the print position. What is particular to the second embodiment is that one of a plurality of speed tables is selected in matching relation with an initial value of the difference between actual and target positions. Assuming that the output data PD of the position difference register 32 is "00011", then the speed table having "010" in its upper three bits will be selected as seen from Table III. The speed control thus occurs according to a speed profile which is distinguishable from the speed profile represented by the speed table shown in Table II. This promotes an optimum speed control for any difference between real and mark positions.

In this manner, the embodiment shown in FIGS. 5 and 6 is successful to control the motor speed with accuracy to a profile which is optimum for a specific initial value of the difference between real and mark positions, despite its simple construction and arrangement.

Various modifications will become possible for those skilled in the art after receiving the teachings of the present disclosure without departing from the scope thereof. For example, the application of the motor control system of the present invention is not limited to the motor of an impact printer shown and described.

What is claimed is:

1. A system for controlling rotation speed of a motor, comprising:
    a real position data storage means for storing real position data indicative of a real position of a rotary shaft of the motor;
    a mark position data storage means for storing mark position data indicative of a mark position of the rotary shaft;
    a position difference calculator means for comparing real position data stored in the real position data storage means with mark position data stored in the mark position storage means and thereby calculating a difference between real and mark positions;
    a speed data storage means for storing a speed table which represents a series of motor speed data corresponding to various differences between the real and mark positions, said data being selectively addressed to be read out of the speed data storage means;
    a head address designating means for designating the head location of the speed table stored in the speed data storage means;
    an adder means for adding an output of the position difference calculator means and an output of the head address designating means to each other;
    an address designating means for designating an initial address of the speed table stored in the storage means in response to an output of the adder means and, thereafter, sequentially varying the designated address up to the head address in accordance with the location of the shaft of the motor; and
    a motor drive means for driving the motor in response to speed data read out of the speed table stored in the speed data storage means.

2. A system as claimed in claim 1, in which the motor comprises a selection servomotor installed in an impact printer.

3. A system as claimed in claim 1, in which the motor comprises a space servomotor installed in an impact printer.

4. A system for controlling rotation speed of a motor, comprising:
    a real position data storage means for storing real position data indicative of a real position of a rotary shaft of the motor;
    a mark position data storage means for storing mark position data indicative of a mark position of the rotary shaft;
    a position difference calculator means for comparing real position data stored in the real position data storage means with mark position data stored in the mark position storage means and thereby calculating a difference between real and mark positions;
    a speed data storage means for storing a plurality of speed tables each comprising a series of motor speed data corresponding to various differences between the real and mark positions, said data being selectively addressed to be read out of the speed data storage means, each of said tables corresponding to a specific initial value of the difference between the real and mark positions;
    a head address designating means for selecting one of the plurality of speed tables stored in the speed data storage means in response to an initial value of the difference between the real and mark positions;
    an adder means for adding an output of the position difference calculator means and an output of the head address designating means to each other;
    an address designating means for designating an initial address of the speed table stored in the storage means in response to an output of the adder means and, thereafter, sequentially varying the designated address up to the head address in accordance with the rotation of the shaft of the motor; and
    a motor drive means for driving the motor in response to speed data read out of selected one of the plurality of speed tables stored in the speed data storage means.

5. A system as claimed in claim 4, in which the motor comprises a selection servomotor of an impact printer.

6. A system as claimed in claim 4, in which the motor comprises a space servotmotor installed in an impact printer.

* * * * *